US005804831A

United States Patent [19]

Romatzick

[11] Patent Number: 5,804,831

[45] Date of Patent: Sep. 8, 1998

[54] LIQUID LEVEL SENSOR FOR USE IN A HOT, PRESSURIZED LIQUID

[75] Inventor: David Howard Romatzick, Milford, Conn.

[73] Assignee: Casco Products Corporation, Bridgeport, Conn.

[21] Appl. No.: 856,907

[22] Filed: May 15, 1997

[51] Int. Cl.[6] ........................... G01N 15/06; G01N 21/49

[52] U.S. Cl. ............................ 250/577; 250/239; 73/293; 340/619

[58] Field of Search .................................... 250/573–577; 73/293; 340/619

[56] References Cited

U.S. PATENT DOCUMENTS

| | | | |
|---|---|---|---|
| 3,844,171 | 10/1974 | Rodger | 73/293 |
| 4,038,650 | 7/1977 | Evans et al. | 340/619 |
| 4,899,585 | 2/1990 | Kulha | 73/293 |
| 5,648,844 | 7/1997 | Clark | 250/577 |

*Primary Examiner*—Stephone B Allen
*Attorney, Agent, or Firm*—Mitchell D. Bittman; John H. Crozier

[57] ABSTRACT

In a preferred embodiment, a liquid level sensor for use in a hot, pressurized liquid, including: an outer housing suitable for immersion in the liquid; an inner housing disposed within the outer housing and containing therein electronic/electrical components; detection apparatus disposed within the outer housing and the inner housing to detect level of the liquid; a space defined between the outer housing and the inner housing; and means to permit the liquid which migrates through a wall of the outer housing into the space and which is vaporized therein to pass to the ambient surroundings, so as to preclude migration of the liquid through a wall of the inner housing.

5 Claims, 1 Drawing Sheet

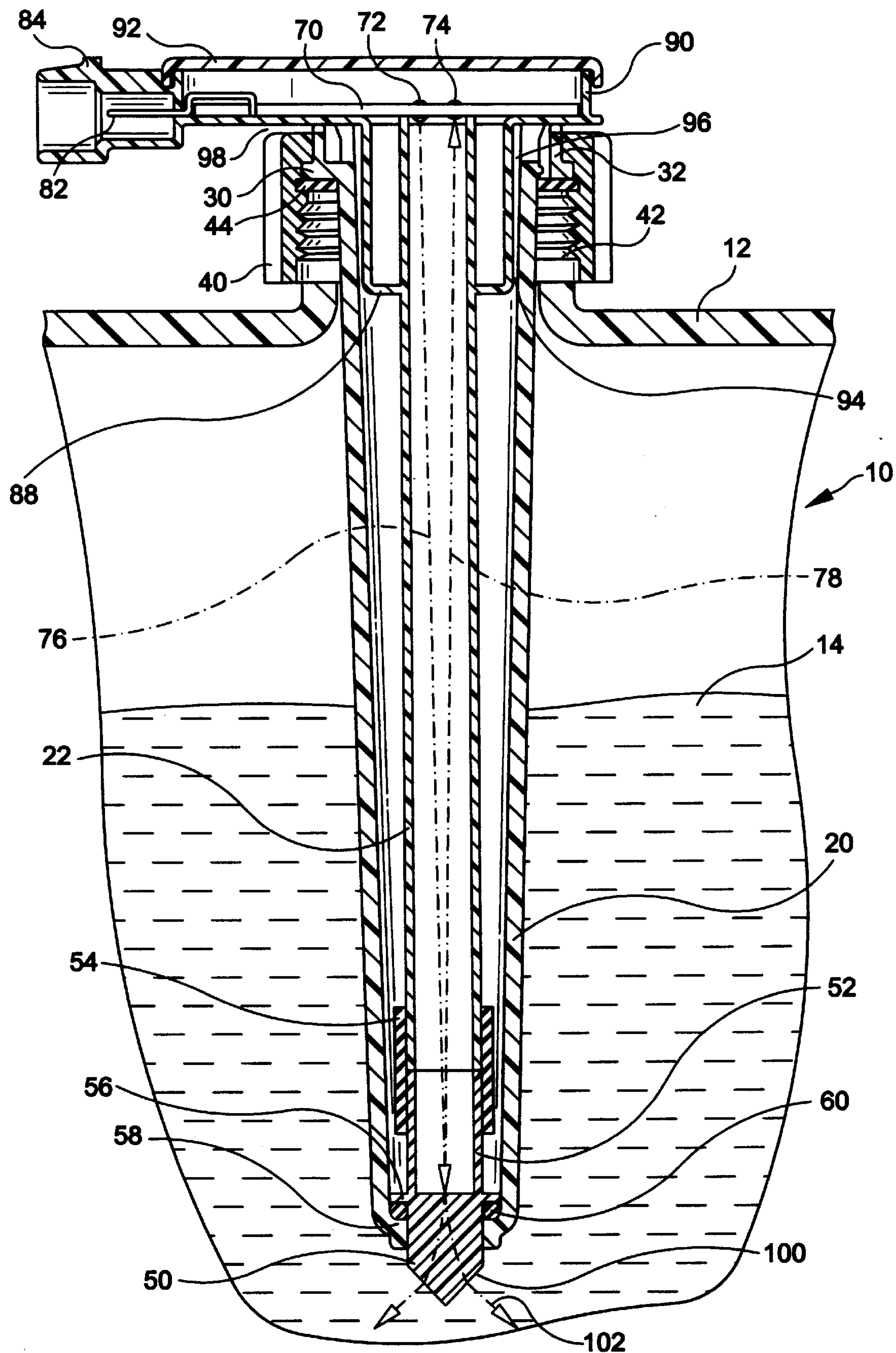
84
92
70
72
74
90
96
98
32
82
30
44
42
12
40
94
88
10
78
76
14
22
20
54
52
56
60
58
100
50
102

LIQUID LEVEL SENSOR FOR USE IN A HOT, PRESSURIZED LIQUID

BACKGROUND OF THE INVENTION

1. Field of the Invention

The present invention relates to liquid level sensors generally and, more particularly, but not by way of limitation, to a novel liquid level sensor especially useful for sensing the level of hot, pressurized water or aqueous solutions.

2. Background Art

Liquid level sensors are widely used for sensing the levels of a variety of liquids.

One type of liquid level sensor optically senses the level of a liquid by using a light emitting diode (LED) to provide a light beam to a prism disposed at the bottom or in the side of a hollow plastic tube inserted in the liquid. If the level of the liquid is at or above the level of the prism, the light beam passes through the prism into the liquid. If, however, the level of the liquid is below the level of the prism, the light beam is reflected from the prism to a photodetector. Electronic circuitry disposed within the tube and connected to the LED and the photodetector provides an output signal indicating whether or not the liquid level is at or above the level of the sensor and the output signal is used to provide such indication and/or or to activate an alarm, for example. Additional pairs of LEDs and photodetectors may be provided at other levels in the plastic tube to sense other levels of the liquid in the same manner. Examples of liquid level sensors of the optical type described above and details of their operation are generally disclosed in U.S. Pat. Nos. 4,840,137, issued Jun. 20, 1989, and 5,279,157, issued Jan. 18, 1994, the disclosures of which patents are incorporated by reference hereinto.

It has been found that, when a liquid level sensor of the type described above is used with a pressurized aqueous solution, such as the coolant used in vehicle engines, for example, water tends to migrate through the plastic tube and interfere with the electronic/electrical components in the plastic tube.

Accordingly, it is a principal object of the present invention to provide a liquid level sensor for use with water or aqueous solutions that prevents water from contacting electronic circuitry therein.

It is a further object of the invention to provide such a liquid level sensor that can be used to sense the level of hot, pressurized water or aqueous solutions.

It is an additional object of the invention to provide such a liquid level sensor that is easily and economically constructed.

Other objects of the present invention, as well as particular features, elements, and advantages thereof, will be elucidated in, or be apparent from, the following description and the accompanying drawing FIGURE.

SUMMARY OF THE INVENTION

The present invention achieves the above objects, among others, by providing, in a preferred embodiment, a liquid level sensor for use in a hot, pressurized liquid, comprising: an outer housing suitable for immersion in said liquid; an inner housing disposed within said outer housing and containing therein electronic/electrical components; detection means disposed within said outer housing and said inner housing to detect level of said liquid; a space defined between said outer housing and said inner housing; and means to permit said liquid which migrates through a wall of said outer housing into said space and which is vaporized therein to pass to the ambient surroundings, so as to preclude migration of said liquid through a wall of said inner housing.

BRIEF DESCRIPTION OF THE DRAWING

Understanding of the present invention and the various aspects thereof will be facilitated by reference to the accompanying drawing figure, submitted for purposes of illustration only and not intended to define the scope of the invention, on which:

The sole drawing FIGURE is an enlarged, side elevational view, partially in cross-section, of a liquid level sensor constructed according to the present invention and mounted in a container of a liquid.

DETAILED DESCRIPTION OF THE PREFERRED EMBODIMENTS

Reference should now be made to the drawing figure on which there is illustrated a liquid level sensor, constructed according to the present invention, and generally indicated by the reference numeral 10. Level sensor is shown mounted on a container 12 which contains a pool of liquid 14 which may be assumed to be hot, pressurized coolant in a vehicle engine (not shown), such liquid being for example, ethylene glycol/water coolant.

Level sensor 10 includes an outer, generally cylindrical, vertical, plastic housing 20 which is slightly tapered from its upper end to its lower end. Outer housing 20 is constructed of a suitable material compatible with the coolant liquid, such as polypropylene. A generally cylindrical, vertical, plastic inner housing 22 is disposed coaxially internally of outer housing 20 and extends substantially the length thereof. Inner housing 22 is constructed of a suitable material, such as polycarbonate.

The upper end of housing 20 terminates in an outwardly facing, annular flange 30 which has an upwardly facing, cylindrical flange 32 formed near the edge thereof. An internally threaded bonnet 40, constructed of a suitable thermoplastic material, engages the upper surface of flange 30 and a threaded nozzle 42 on container 12 to removably mount level sensor 10 to the container. An annular rubber seal 44 is disposed between the lower surface of flange 30 and the top of nozzle 40.

A generally cylindrical prism 50, preferably constructed of polysulfone or polyetherimide, extends from the lower end of outer housing 20 and has an upper cylindrical portion 52 having the same diameter as inner housing 22. The lower end of inner housing 22 abuts the upper end of cylindrical portion 52 and is joined thereto by a cylindrical rubber sleeve 54 extending over the cylindrical portion and a section of the lower end of the inner housing. An outwardly facing, annular flange 56 formed around the lower end of cylindrical portion 52 rests on an inwardly facing annular flange 58 formed around the inner periphery of the lower end of outer housing 20. A circular rubber seal 60 is frictionally disposed between the peripheral surface of prism 50 and the inner surface of outer housing 20 to seal the interior of the outer housing against the ingress of liquid 14.

Internally disposed at the upper end of inner housing 22 is a circuit board 70 on which are disposed a light emitting diode (LED) 72 and a photodetector 74. LED 72 is arranged so as to provide an incident light beam 76 to prism 50 and photodetector 74 is arranged so as to receive a reflected light beam 78 from the prism. Circuit board 70 is operatively connected to LED 72, photodetector 74, and contact pins, as at 82, in an electrical connector 84 formed at one end of the upper portion of inner housing 22.

A cup shaped member 88 is formed as part of inner housing 22 and extends around the upper end thereof defining, in part, an upper housing 90 of which electrical connector 84 is a part and in which mounting plate 70 is disposed. Upper housing 90 is closed by a dust cap 92. The inner surface of outer housing 20 and a portion of the outer surface of cup shaped member 88 are separated by spacing ribs, as at 94, to provide a series of vertical channels, as at 96, for communication between the annular space defined between outer and inner housings 20 and 22 and the ambient surroundings through an annular space 98.

In operation, and is described in detail in the above-referenced patents, LED 72 provides incident light beam 76 to the inner surface of prism 50. As described above, if the level of liquid 14 is at or above the level of prism 50 (as is shown on the figure), then light beam 72 will exit the outer surface 100 of prism 50, as at 102. If, however, the level of liquid 14 were below the level of prism 50, incident light beam 72 will be reflected internally from outer surface 100 and reflected light beam 78 will be detected by photodetector 74. In either case, circuitry (not shown) on circuit board 76 will provide an appropriate output signal through electrical connector 84, the signal in the latter case indicating a low level condition.

As indicated above, the annular space defined between outer and inner housings 20 and 22 is at atmospheric pressure and level sensor 10 is constructed such that the interior of inner housing is not hermetically sealed so that that space, also, is at atmospheric pressure. Therefore, there is no differential pressure across the wall of the inner housing. Now, if any of the water in hot, pressurized coolant liquid 14 migrates through the wall of outer housing 20 into the annular space defined between outer and inner housings 20 and 22, there will be no pressure potential to drive the water through the wall of inner housing 22 into the interior of the inner housing containing circuit board 80. Since the temperature of pressurized liquid 14 is above the atmospheric boiling point of water, the interior of level sensor 10 will also be above the atmospheric boiling point of water, and any water in the annular space defined between outer and inner housings 20 and 22 will evaporate and will pass upwardly through vertical channels 94 and out of level sensor 10 through annular space 98 into the ambient surroundings, thus precluding the possibility of water contacting circuit board 80.

It will thus be seen that the objects set forth above, among those elucidated in, or made apparent from, the preceding description, are efficiently attained and, since certain changes may be made in the above construction without departing from the scope of the invention, it is intended that all matter contained in the above description or shown on the accompanying drawing FIGURE shall be interpreted as illustrative only and not in a limiting sense.

It is also to be understood that the following claims are intended to cover all of the generic and specific features of the invention herein described and all statements of the scope of the invention which, as a matter of language, might be said to fall therebetween.

I claim:

1. A liquid level sensor for use in a hot, pressurized liquid, comprising:

(a) an outer housing suitable for immersion in said liquid;

(b) an inner housing disposed within said outer housing and containing therein electronic/electrical components;

(c) detection means disposed within said outer housing and said inner housing to detect level of said liquid;

(d) a space defined between said outer housing and said inner housing; and (e) means to permit said liquid which migrates through a wall of said outer housing into said space and which is vaporized therein to pass to the ambient surroundings, so as to preclude migration of said liquid through a wall of said inner housing.

2. A liquid level sensor, as defined in claim 1, wherein: said space and an interior of said inner housing are at atmospheric pressure.

3. A liquid level sensor, as defined in claim 1, wherein: said outer housing and said inner housing are generally cylindrical and coaxial and said detection means includes a prism disposed at lower ends of said outer and inner housings and protruding into said liquid.

4. A liquid level sensor, as defined in claim 1, wherein: said outer housing is constructed of polypropylene and said inner housing is constructed of polycarbonate.

5. A liquid level sensor, as defined in claim 1, wherein: said means to permit comprises at least one passageway defined between said outer housing and said inner housing.

* * * * *